Figure 1:
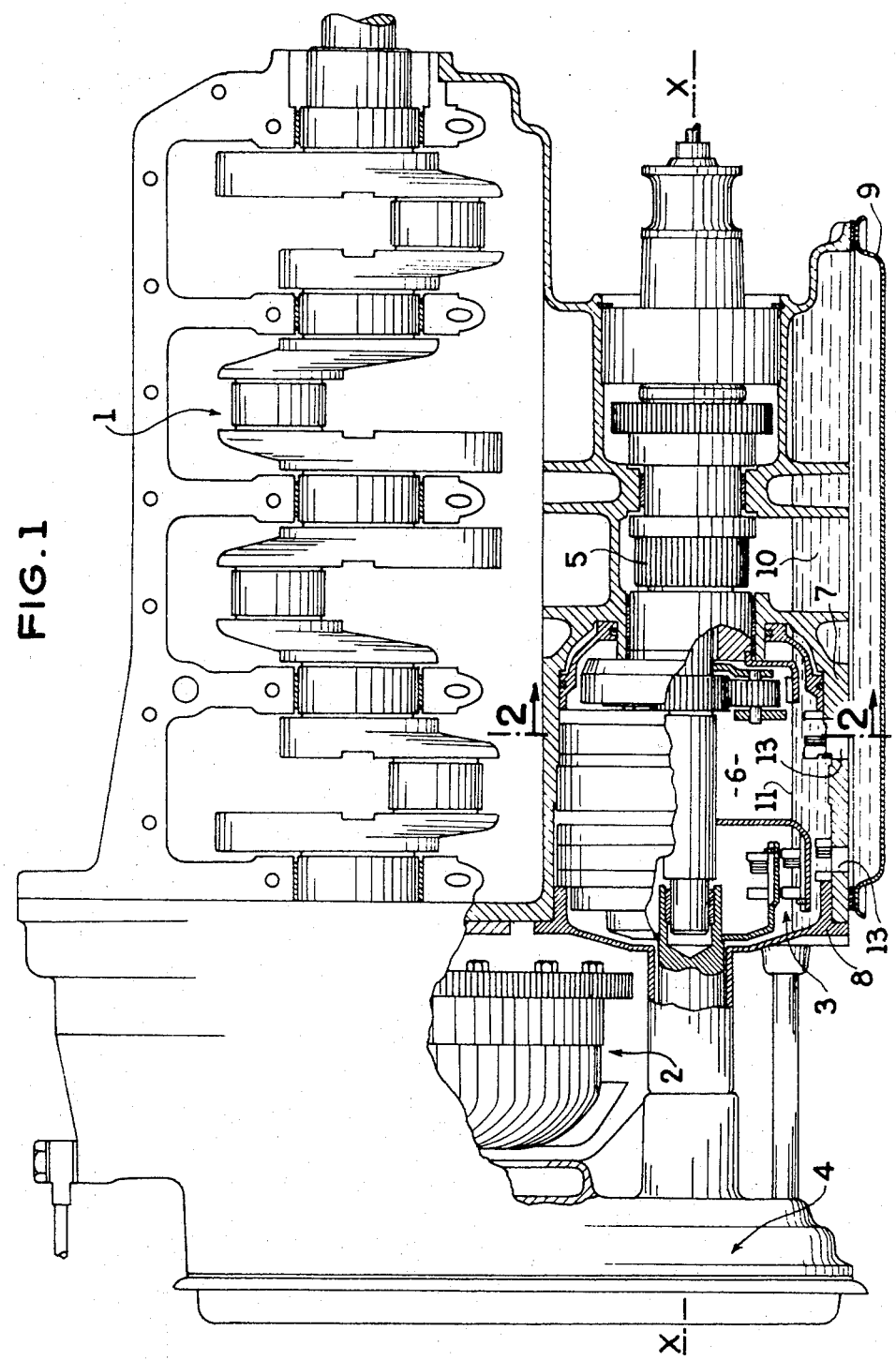

United States Patent [19]

Piret

[11] 3,777,849
[45] Dec. 11, 1973

[54] AUTOMATIC TRANSMISSION CASING UNIT FOR AN AUTOMOBILE VEHICLE

[75] Inventor: Jean Piret, Bougival, France

[73] Assignees: Automobiles Peugot, Paris; Regie Nationale Des Usines Renault, Billancourt, France

[22] Filed: July 6, 1971

[21] Appl. No.: 160,027

[30] Foreign Application Priority Data
July 7, 1970 France .......................... 7025104

[52] U.S. Cl.............................. 184/6.12, 184/6.28
[51] Int. Cl............................................. F01m 1/02
[58] Field of Search............... 184/6.28, 6.12, 11 R, 184/13 R; 123/196 R; 74/695

[56] References Cited
UNITED STATES PATENTS

| | | | |
|---|---|---|---|
| 2,984,122 | 5/1961 | Woolley.......................... | 184/6.12 X |
| 1,533,641 | 4/1925 | Fekete et al. ..................... | 184/13 R |
| 2,980,209 | 4/1961 | Rabson ............................ | 184/11 R |
| 2,654,441 | 10/1953 | Orr et al. ......................... | 184/11 R |
| 1,745,760 | 2/1930 | Heinish ............................ | 184/13 R |

Primary Examiner—Manuel A. Antonakas
Attorney—Burns, Doane et al.

[57] ABSTRACT

A casing defines a chamber which contains a gear change mechanism for a vehicle and communicates by way of at least one opening with a sump under the chamber. The opening has a wall portion which tapers in a direction opposed to the direction in which oil is driven by the change mechanism whereby the change mechanism drives the oil into the sump in the manner of a centrifugal pump.

6 Claims, 2 Drawing Figures

AUTOMATIC TRANSMISSION CASING UNIT FOR AN AUTOMOBILE VEHICLE

The present invention relates to mechanisms for changing gear or automatic transmissions of the type having planetary gears and hydraulically-controlled coupling means for automobile engine-drive units and more particularly concerns those of these units in which the vertical distance between the axis of the mechanism and the bottom of the oil sump is small with respect to the diameter of the mechanism.

These conditions are met with in particular in transverse engine-drive units disposed in the front of small front wheel drive vehicles owing to the limited space available under the bonnet above the plane defining the ground clearance of the vehicle. In this case, there is produced a considerable splashing of the mechanism which is immersed in the oil to a relatively great depth. Usually, the casing defines a roughly cylindrical chamber and cavities which radially project from the cylindrical chamber and extend in a direction parallel to the axis of the transmission and receive certain component parts of the mechanism. The oil is thrown by centrifugal force radially towards these cavities and then forced longitudinally along the cavities to the end of the casing where they return to the oil sump. This oil therefore encounters numerous obstacles in its path and an agitation occurs which retards its return to the sump. This oil has a tendency to remain trapped in the casing of the mechanism and this results in an abnormally high heating of the oil of the mechanism and reduced efficiency.

Suggestions have been made to remedy this drawback by facilitating the cooling of the oil by provision of fins or corrugations formed in the bottom of the sump. However, this remedy is insufficient if an excessive amount of the oil remains trapped in the casing of the mechanism.

An object of the invention is to remedy the aforementioned drawback.

The invention provides a gear change mechanism casing unit for a vehicle comprising a casing defining a main chamber in which are located the gear change mechanism, and an oil sump secured to the lower part of the casing, wherein at least one opening is provided in the wall of the casing and puts the chamber and the oil sump in communication with each other, the wall portion of the casing which defines the opening and is directed towards the incident oil flow having a roughly tapered shape so as to allow the oil to pass to the sump, whereby the mechanism acts in the manner of a centrifugal pump.

This opening is disposed in the vicinity of the turning component parts of the mechanism so as to still further improve the circulation of the oil.

Another object of the invention is to provide a gear change mechanism which comprises the casing unit defined hereinbefore.

Further features and advantages of the invention will be apparent from the ensuing description which concerns by way of example an engine-drive unit such as that described in the U.S. Pat. No. 3,703,107, which discloses a gear type oil pump 4 in FIG. 1, for supplying oil to the gear box for lubrication and for supplying oil to actuate the gear change mechanism.

Figure 2:
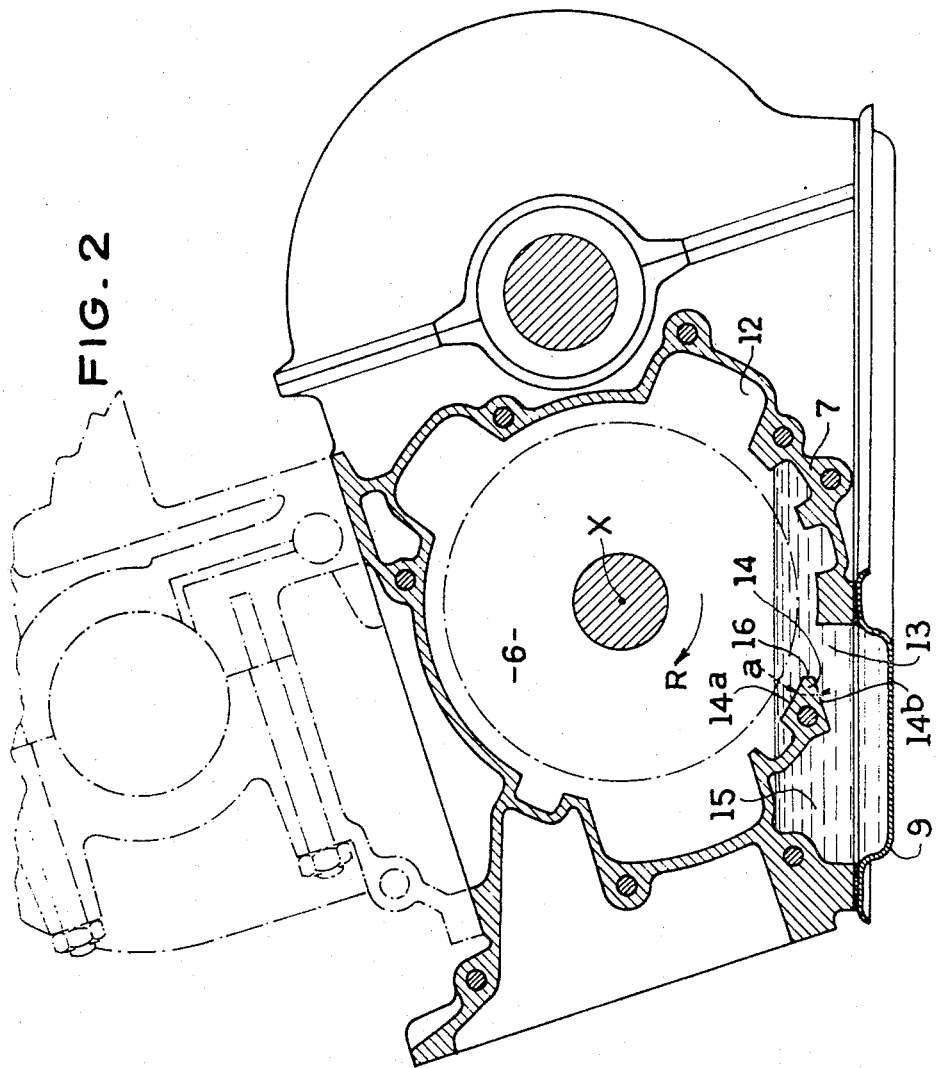

In the drawings :

FIG. 1 is a side elevational view, partly in section through the axis of the crankshaft of the engine and the axis of the transmission mechanism, and FIG. 2 is a cross-sectional view taken along line 2—2 of FIG. 1 on an enlarged scale.

The engine-drive unit according to that described in the aforementioned U.S. Pat. No. 3,703,107 and shown in the drawings comprises :

a crankshaft 1 ;
a hydrokinetic torque converter 2 ;
an automatic transmission mechanism 3 ;
a drive received in an end part 4 of the unit and connecting the output of the converter to the input of the transmission, and
a gear pinion 5 meshed with the differential gear wheel.

The mechanism 3 is contained in a chamber 6 defined by a main casing 7 and a cover 8. The casing 7 is closed in its lower part by a pressed-metal cover 9 which defines a space 10 constituting an oil sump. It can be seen that the vertical distance between the axis X—X of the mechanism 3 and the bottom of the oil sump constituted by the cover 9 is small with respect to the diameter of the mechanism 3. There results a considerable splashing of the rotating parts of the mechanism 3 with oil whose level, when stationary, is in the neighbourhood of the line 11. In operation, the oil, which enters the chamber 6 after having served to lubricate or actuate the mechanism, must return to the sump 10 and dissipate heat.

This return of the oil to the sump usually occurs, as explained before, by way of cavities or passages formed in radial extensions 12 of the transmission casing. However, owing to the large amount of oil put into agitation, the particular position of these passages and the numerous obstacles that the oil encounters, turbulences are created which retard the discharge of the oil. A large part of this oil is driven in a circulatory motion inside the transmission casing. Consequently, there is an abnormally high heating of the whole of the mechanism and a decreased efficiency.

According to the invention, openings 13 are formed preferably in the base of the casing 7 in regions near the rotating parts of the mechanism. These openings are partly defined by beveled or tapered wall parts 14 having one face $14^a$ part-cylindrical and centered on the axis X-X. The angle $a$ between the two faces $14^a$, $14^b$ of this wall is sufficiently small for the oil to be able to pass from the chamber 6 to chamber 15 without encountering high resistance. The edge 16, which is a leading edge relative to the direction of rotation (arrow R) and defines a part of each opening, can be sharp, radiused or have, as shown in the drawings, a small flat face. The openings 13 therefore have a roughly tangential orientation and extend in the direction of rotation of the mechanism (arrow R). The openings 13 communicate with passages 15 which are defined by the casing 7 and the cover 9 and communicate with the oil sump 10.

Owing to this very simple arrangement, it can be seen that the transmission mechanism acts in the manner of a centrifugal pump urging the oil toward the sump. There is less splashing and consequently increased efficiency and an improved recycling of the oil which suitably dissipates the heat.

It will be understood that the number of openings such as 13 is not limited to two since more may be provided, in particular if the transmission has a high number of transmission speeds and is consequently longer.

I claim:

1. A gear change mechanism unit for a vehicle, said unit comprising a casing wall means defining a gear chamber in which a gear change mechanism is mounted for rotation about a central axis, said casing wall means having an opening therein, an oil sump means adjacent a lower part of said gear chamber for receiving oil passing through said opening from the interior of said gear chamber to said sump, said gear chamber wall means being substantially concentric with said central axis adjacent said opening, said wall portion surrounding said opening having a leading edge, said leading edge portion defining a part of said opening and generally extending in a direction tangent to a circle having its center on said central axis.

2. A unit as claimed in claim 1 comprising a plurality of said openings disposed respectively in regions of the rotating component parts of the change mechanism.

3. A unit as claimed in claim 1 wherein the opening is located in a lower part of the unit.

4. A unit as claimed in claim 1 wherein said part of said wall portion tapers toward said leading edge portion.

5. A gear change mechanism unit for a vehicle comprising wall means defining a gear chamber and supporting a shaft for rotation about a central axis, said shaft having at least one gear secured on said shaft for rotation about said axis, a portion of said wall means radially aligned with said gear having an opening therein, an oil sump adjacent said wall means for receiving and containing oil flowing through said opening, said opening having a portion extending substantially tangentially to said gear, whereby upon rotation of said gear about said central axis, oil is directed tangentially of said gear through said opening and into said sump.

6. A unit as claimed in claim 5 wherein said wall means is substantially cylindrical about said central axis.

* * * * *